Aug. 7, 1956
J M. SUMMERS
2,757,429
QUICK ACTING FASTENER
Filed April 5, 1952
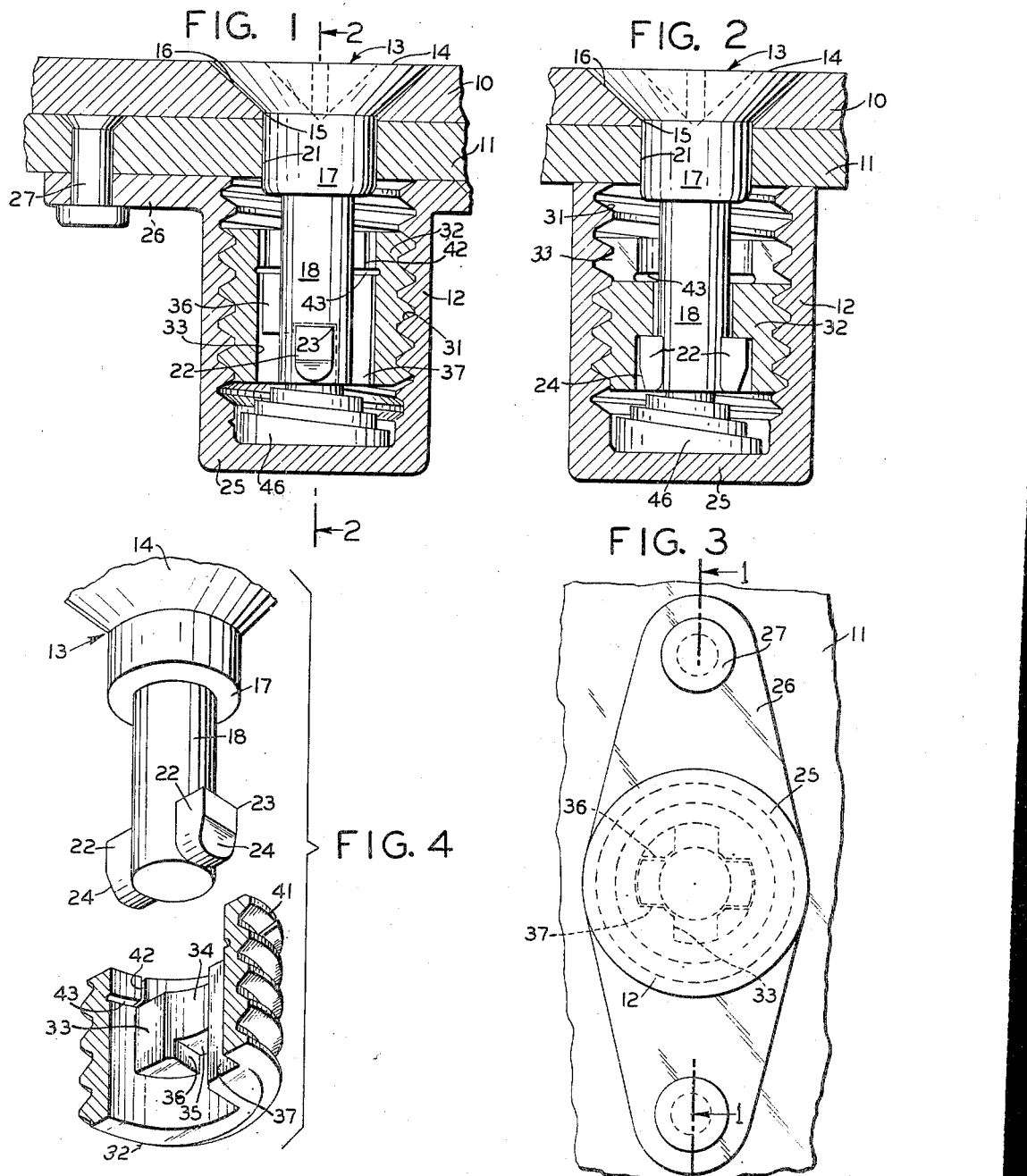
INVENTOR.
J. MILLS SUMMERS
BY John P. Chandler
his ATTORNEY.

United States Patent Office 2,757,429
Patented Aug. 7, 1956

2,757,429

QUICK ACTING FASTENER

J Mills Summers, Englewood, N. J.

Application April 5, 1952, Serial No. 280,761

4 Claims. (Cl. 24—221)

This invention applies to quick operating fasteners to meet certain specific needs of attaching panels or any detachable members to a structure. The normal, quick operating fastener pulls the members together by the use of a ramp, hump, detent and stop, depending upon a resilient means for retaining it against retrogression. This basic method permits a slight relaxing of tension, allowing for some sheet separation but necessitates the building up of structure all around the opening to carry shear loads from one side of the opening to the other.

Where it is desired to carry shear loads through the removable panel, thus reducing structural weight, it is common practice to use screws or bolts through match-drilled holes to engage a threaded receptacle or stop nut riveted to the back surface of the structure, the stop nut being of the friction thread type. This allows for pulling the sheets tightly together and depends upon friction built into the stop nut and surface contact between the head of the screw and that of the removable panel to resist retrogression. For flush applications the head of the screw is flared and fits into a mating countersunk depression in the panel.

Since a stressed panel must develop the shear strength it is subject to, which is provided for by means of structural reinforcement around the opening where non-stressed panels are used, it becomes necessary to employ many more fasteners closer together to develop the desired shear value of the bearing area of the screws in contact with the sides of the match-drilled holes through which they carry the loads from structure to panel and back to structure across the opening. It is not uncommon to use a hundred or more of such type fasteners in a single panel.

The use of screws and stop nuts has necessitated a requirement that the stop nuts must be removed and replaced when torque for attachment has fallen below a predetermined figure. In fact stop nuts are tested to only 15 complete removal and applications within prescribed torque figures in order to qualify. It is always necessary to entirely remove the threaded engagement of the screw with the stop nut which permits frequent cross threading and destruction of the fastener. Oftentimes a screw intended for a lesser grip thickness is inadvertently applied through a greater grip thickness and results in less than a full engagement of the threaded position and then allows threads to be stripped with less than the prescribed torque for fastening it.

For a full threaded engagement many turns of a screw driver are called for before finally setting it home with not more than the prescribed torque. It takes time to find and run home the many screws around these panels and be assured each fastener is secure with a torque wrench or driver. The hazards of over-driving a screw are always present. When failure occurs, all fasteners must be removed and the faulty stop nut drilled out of the structure and with the mating screw destroyed. A new stop nut is riveted to the structure and a new screw is applied when the panel is again fastened in place. And time is of the essence when adjustments require the removal and reapplication of such panels.

An important object of the present invention is to provide a quick operating fastener which employs the same hole preparation of structure and panel as the stop-nut and screw type fastener, the same diameter of holes, the same dimensions between holes, the same distance from fastener to fastener around the panel. In the improved fastener of the present invention, however, the friction threaded engagement is always fully mated. The parts having such threaded engagement are never removed from full frictional contact one with the other. There is required no finding and proper mating of threads and the threads cannot become crossed nor short threaded. Also the rotatable part is always ready to withstand the full required torque for setting home the fastener.

Another object of the invention is to provide a fastener which requires less than one complete turn of a screw driver to engage and securely fasten it each time it is applied. It requires less than one complete turn to unfasten it. The useful life of the threads is extended to many times that of the stop-nut type. The time required to remove and replace a panel is but a fraction of that for the stop-nut type. The frictional resistance to retrogression is no less and may be more than for the stop-nut type. The sheets are pulled tight together with the same torque, the shear loads are carried in exactly the same way but the hazards of misapplying this new fastener have been eliminated as will be described.

A further object of the invention is to provide a new type of rotatable stud for a quick operating fastener wherein the usual separately formed cross-pin is eliminated and the shank is formed with a portion of reduced diameter intermediate its end to provide an integrally formed cross-pin element of unique design.

Yet another object is to provide an improved receptacle for a fastener which can be used with conventional studs employed in fasteners of this character and which draws the sheets together with no relaxing of tension due to the cross pin dropping into detents.

In the drawing:

Fig. 1 is a central section taken through a fastener embodying the present invention;

Fig. 2 is a section taken on line 2—2 of Fig. 1;

Fig. 3 is a bottom plan view of the receptacle forming the female part of the fastener;

Fig. 4 is a broken exploded view showing the internal formation of the insert and the relation thereto of the stud at it enters the insert.

In Figs. 1 and 2 there are shown two sheets 10 and 11, hereinafter referred to for convenience as the "upper" sheet and the "lower" sheet, respectively. The fastener comprises a receptacle 12 and a headed stud 13 which is received in the receptacle in secured relation.

In many installations it is desirable to have the head 14 of the stud flush with the upper surface of the upper sheet and in the instance shown an opening 15 in the upper sheet has an outwardly flared upper section 16 to receive the head.

The shank 17 of the stud has a lower portion 18 of reduced diameter, the upper portion passing through an opening 21 in the lower sheet which is aligned with opening 15 in the upper sheet. In the event that the head is not of the countersunk type the entire shear loads are transmitted to the upper shank section 17 but in the arrangement shown the head takes a part of the shear load. At the lower end of the stud there are formed two laterally extending lugs 22 which will be sometimes collectively referred to hereafter as a "cross pin element." As distinguished, however, from the usual cross pin in quick acting fasteners, which is a separate element passing through a drilled hole, the improved stud of the present invention provides a cross pin element which is formed integrally with the stud and is of a transverse width, when viewed as in Fig. 1, slightly less than the diameter of the lower section 18 of the shank. In other words, the shank is formed with an intermediate section 18 of reduced diameter and the lower end including the lugs 22 is of full or substantially full diameter with two opposed sides machined away to form the actual lugs. The lower edge of the cross pin element may be rounded and the upper edge has substantially right angular corners and vertical walls, as shown at 23 for a purpose to be described. To facilitate entry of the stud into the receptacle, the opposed terminal faces of the lugs are tapered at their lower ends as shown at 24 (Fig. 2), and the length of the cross pin element is shown as being slightly less than the diameter of main stud section 17.

The receptacle includes a shell and an insert, the shell having a lower wall 25 and laterally extending attaching ears 26 at its upper end for securement to the lower sheet as by means of rivets 27. In some types of installation it will not be necessary to secure the shell to the lower sheet and in this instance the outer periphery of the shell is formed with a non-circular contour and is supported by a wrench while the stud is manipulated by a screwdriver or other tool. The shell is internally threaded as shown at 31 and an externally threaded insert or captive nut 32 is received therein.

The insert is formed with a longitudinal opening or bore including a generally rectangular transverse intermediate section or slot 33 of such proportions as to permit the cross pin element to readily pass therethrough. Lands 34 remain after the formation of the transverse section of the bore and substantially in the center of each land there is formed a horizontal seat or detent 35 for the lug with right angular corners and of such width as to receive the lug and vertical walls extending downwardly from the corners.

The wall defining one side of the seat forms a relatively shallow abutment 36 and the wall defining the other side thereof forms a relatively deeper abutment 37 which is shown as extending all the way to the lower edge of the insert.

The insert is externally threaded as at 41 and the threads are initially formed to provide free rotation in the receptacle. This free rotation is restrained to a predetermined degree such as by setting a portion of one thread section out of phase with another portion thereof. One preferred method of doing this is to castellate the upper end of the insert by forming a plurality of milled notches or saw-cuts 42 and then setting the segments so formed outwardly. In order to control the point at which the bend occurs and also to impart a measure of resilience to these segments there is formed an annular internal recess 43 at the lower ends of the slots 42. The stud is urged upwardly by means of a spiral compression spring 46.

In use, the stud is inserted into the receptacle, the cross pin element passing through slot 33 and the stud is rotated to the right at which time the lugs clear the lower abutments and enter the opposed seats. If the insert is positioned too far inwardly in the receptacle to clear the lower abutment the operator will instantly know such to be the case because he will fail to sense the act of the cross pin element seating itself after less than one quarter turn. In other words, if after this one quarter turn release of the screw driver causes the stud to come out a substantial distance due to the action of spring 46 and this insert is positioned too near the base wall 25 and this can be corrected by turning the stud in the opposite direction one or two turns. The stud is again rotated to the right, the lugs seat themselves and rotation continues until the sheets are drawn together which generally requires less than one turn.

The terms "upper" and "lower" referring to parts of the fastener and for the sheets, as used in the appended claims, are not employed in any limiting sense since if the fastener is used to secure a panel to the bottom of a structure, such as an airplane wing, the position of the parts is reversed.

While one form or embodiment of the invention has been shown and described herein for illustrative purposes, and the construction and arrangement incidental to one specific application thereof has been disclosed and discussed in detail, it is to be understood that the invention is limited neither to the mere details or relative arrangement of parts, nor to its specific embodiment shown herein, but that extensive deviations from the illustrated form or embodiment of the invention may be made without departing from the principles thereof.

I claim:

1. A quick-operating fastener for securing together two sheets having aligned openings therein, and including a headed stud, said stud having an upper section of a size which closely fits the openings in the sheets and which takes up shear loads therebetween, a head of greater diameter than the upper section and provided with tool receiving means to rotate the stud, a lower section of a diameter not greater than that of the upper section, and an intermediate section of lesser diameter than either of said sections, two opposed sides of said lower section being of reduced thickness to form laterally extending, integrally formed lugs providing a cross-pin element whose upper wall is substantially flat and whose side walls are substantially vertical, an internally threaded receptacle to receive the stud and an externally threaded insert disposed therein and having a through bore including a transverse slot of such size as to permit the lugs to pass therethrough, means for securing said threaded receptacle against rotation and substantially flat seats for the lugs at the lower end of the slot, the seats being defined on each side thereof by downwardly extending substantially vertical walls which form abutments for the sides of the lugs when the same are seated, one of said abutments being of greater depth than the other, a spring at the lower end of the stud urging the same upwardly, at least one of the thread sections having rotation restraining means to restrain otherwise free rotation of the insert relative to the receptacle.

2. A quick-operating fastener for securing a plurality of sheets together having aligned openings therein, and including a headed stud provided with tool receiving means to rotate the stud, said stud having an upper section which takes up shear loads therebetween, a lower section of a diameter not greater than that of the upper section, and an intermediate section of lesser diameter than either of said sections, two opposed sides of said lower section being of reduced thickness to form laterally extending, integrally formed lugs providing a cross-pin element formed with substantially flat upper and vertical side walls, an internally threaded receptacle to receive the stud and an externally threaded insert disposed therein and having a through bore including a transverse slot of such size as to permit the lugs to pass therethrough, means for securing said threaded receptacle against rotation, and substantially flat seats for the lugs at the lower end of the slot and being defined on each side thereof by walls extending downwardly at substantially right angles to the seat and forming abutments for the sides of the lugs when the same are seated, one of said abutments being of greater depth than the other, a spring for urging the stud upwardly, at least one of the thread sections having rotation restraining means to prevent free rotation of the insert relative to the receptacle.

3. A quick-operating fastener for securing two sheets together and which have aligned openings therein, and including a headed stud provided with tool receiving means to rotate the stud, said stud having an upper section which takes up shear loads between the sheets, a lower section of a diameter not greater than that of the upper section, and an intermediate section of lesser diameter than either of said sections, two opposed sides of said lower section being of reduced thickness to form laterally extending, integrally formed lugs providing a cross-pin element whose upper edges are substantially right angular and whose opposed walls are flat and generally parallel with the axis of the stud, an internally threaded receptacle to receive the stud and an externally threaded insert disposed therein and having a through bore including a transverse slot of such size as to permit the lugs to pass therethrough, means for securing said threaded receptacle against rotation and seats for the lugs at the lower end of the slot, each of the seats being defined on each side thereof by walls extending downwardly at substantially right angles to the seat and forming vertical abutments for the sides of the lugs when the same are seated, one of said abutments being of lesser depth than the other and formed with substantially right angular lower corners, a spring urging the stud upwardly, at least one of the thread sections having rotation restraining means to prevent free rotation of the insert relative to the receptacle.

4. A quick-operating fastener for securing two sheets together which have aligned openings therein, and including a stud provided with a head which engages the upper sheet, said stud having an upper section which takes up shear loads between the sheets, a lower section of a diameter not greater than that of the upper section, and an intermediate section of lesser diameter than either of said sections, two opposed sides of said lower section being of reduced thickness to form laterally extending, integrally formed lugs providing a cross-pin element whose upper wall is substantially flat and lower wall is rounded, and whose opposed side walls are flat with right angular corners, an internally threaded receptacle to receive the stud and provided with laterally extending ears provided with means for rigid securement to the lower sheet, an externally threaded insert disposed therein and having a through bore including a transverse slot of such size as to permit the lugs to pass therethrough, and substantially flat seats for the lugs at the lower end of the slot, each of the seats being defined on each side thereof by walls extending downwardly at substantially right angles to the seat and forming abutments for the sides of the lugs when the same are seated, one of said abutments in each seat being of lesser depth than the other and having a right angular lower edge, a spring at the lower end of the stud urging the same upwardly, at least one of the thread sections having rotation restraining means to prevent free rotation of the insert relative to the receptacle.

References Cited in the file of this patent
UNITED STATES PATENTS

| | | |
|---|---|---|
| 2,323,260 | Venditty | June 29, 1943 |
| 2,370,327 | Rosan | Feb. 27, 1945 |
| 2,455,885 | Theurer | Dec. 7, 1948 |
| 2,486,411 | Huelster | Nov. 1, 1949 |
| 2,571,641 | Wing | Oct. 16, 1951 |
| 2,691,199 | Schlueter | Oct. 12, 1954 |